United States Patent
Kim et al.

(10) Patent No.: US 8,737,037 B2
(45) Date of Patent: May 27, 2014

(54) CERAMIC ELECTRONIC COMPONENT AND METHOD OF MANUFACTURING THE SAME

(75) Inventors: Jong Han Kim, Gyunggi-do (KR); Hyun Chul Jeong, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 166 days.

(21) Appl. No.: 13/333,220

(22) Filed: Dec. 21, 2011

(65) Prior Publication Data
US 2013/0049532 A1 Feb. 28, 2013

(30) Foreign Application Priority Data

Aug. 31, 2011 (KR) .................. 10-2011-0088030

(51) Int. Cl.
*H01G 4/228* (2006.01)
(52) U.S. Cl.
USPC .............. 361/306.3; 361/306.1; 361/306.2; 361/321.1; 361/321.2; 361/305
(58) Field of Classification Search
USPC .............. 361/306.3, 306.1, 321.2, 321.4, 361/303–305, 311–313, 321.1
See application file for complete search history.

(56) References Cited

U.S. PATENT DOCUMENTS

| | | | |
|---|---|---|---|
| 6,195,249 B1 * | 2/2001 | Honda et al. | 361/306.3 |
| 6,559,574 B2 * | 5/2003 | Maruyama | 310/323.02 |
| 6,621,682 B1 * | 9/2003 | Takakuwa et al. | 361/306.3 |
| 7,050,288 B2 * | 5/2006 | Ahiko et al. | 361/303 |
| 7,129,799 B2 * | 10/2006 | Sasaki | 331/158 |
| 7,754,365 B2 * | 7/2010 | Fukushima et al. | 429/483 |
| 7,923,395 B2 * | 4/2011 | Randall et al. | 501/135 |

FOREIGN PATENT DOCUMENTS

| | | |
|---|---|---|
| JP | 2002-164248 | 6/2002 |
| JP | 2002-198255 | 7/2002 |

* cited by examiner

*Primary Examiner* — Nguyen T Ha
(74) *Attorney, Agent, or Firm* — McDermott Will & Emery LLP

(57) ABSTRACT

There are provided a ceramic electronic component and a method of manufacturing the same. The ceramic electronic component includes: a ceramic element; and an internal electrode layer formed within the ceramic element, having a thickness of 0.5 μm or less, and including a non-electrode region formed therein, wherein an area ratio of the non-electrode region to an electrode region of the internal electrode layer, in a cross section of the internal electrode layer is between 0.1% and 10%, and the non-electrode region includes a ceramic component.

12 Claims, 3 Drawing Sheets

A-A'

A-A'

CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2011-0088030 filed on Aug. 31, 2011, in the Korean Intellectual Property Office, the disclosure of which is incorporated herein by reference.

BACKGROUND OF THE INVENTION

1. Field of the Invention

The present invention relates to a ceramic electronic component and a method of manufacturing the same, and more particularly, to a ceramic electronic component having excellent reliability and a method of manufacturing the same.

2. Description of the Related Art

In general, an electronic component using a ceramic material, such as a capacitor, an inductor, a piezoelectric element, a varistor, a thermistor, or the like, includes a ceramic element made of a ceramic material, internal electrode layers formed within the ceramic element, and external electrodes installed on surfaces of the ceramic element, such that they are connected with respective internal electrode layers.

Among ceramic electronic components, a multilayer ceramic capacitor includes a plurality of laminated dielectric layers, internal electrode layers disposed to face each other, while having each of the dielectric layers interposed therebetween, and external electrodes electrically connected with the respective internal electrode layers.

The multilayer ceramic capacitor is commonly used as a component of mobile communications devices such as notebook computers, PDAs (Personal Digital Assistants), mobile phones, and the like, due to its advantages, such as miniaturization, high capacitance, and easy mounting.

Recently, as electronic devices have increasingly had higher performances and have become lighter, thinner, shorter, and smaller, electronic components have also been required to be small, have a high performance, and incur low manufacturing costs. In particular, the development of CPUs which have high speeds and devices which are smaller and lighter, digitalized, and multi-functionalized has prompted, research and development aimed at implementing a multilayer ceramic capacitor which is small, includes thinner layers, has high capacitance, and has low impedance in a high frequency area, and the like have been actively undertaken.

SUMMARY OF THE INVENTION

An aspect of the present invention provides a ceramic electronic component having excellent reliability and a method of manufacturing the same.

According to an aspect of the present invention, there is provided a ceramic electronic component including: a ceramic element; and an internal electrode layer formed within the ceramic element, having a thickness of 0.5 μm or less, and including a non-electrode region formed therein, wherein an area ratio of the non-electrode region to an electrode region of the internal electrode layer, in a cross section of the internal electrode layer is between 0.1% and 10%, and the non-electrode region includes a ceramic component.

A thickness of the internal electrode layer may be 0.5 μm or less.

Connectivity of the internal electrode layer, as defined by a ratio of an actual length of the internal electrode layer to the total length of the internal electrode layer (actual length of the internal electrode layer:total length of the internal electrode layer), may be 90% or more.

The internal electrode layer may be formed of a conductive paste including metal powder and ceramic-based substance powder whose grain size ratio to that of the metal powder exceeds 1:5.

The non-electrode region may be formed by firing a conductive paste forming the internal electrode layer at a heating rate ranging from 30° C./60 s to 50° C./60 s.

According to another aspect of the present invention, there is provided a ceramic electronic component including: a ceramic element including a plurality of dielectric layers laminated therein; and internal electrode layers having each dielectric layer interposed therebetween, and having a thickness of 0.5 μm or less, wherein an area ratio of a non-electrode region trapped in each internal electrode layer to an electrode region, in a cross section of the internal electrode layer is between 0.1% and 10%, and connectivity of the inner electrode layer is 90% or more.

The non-electrode region may include ceramic-based substance powder whose grain size ratio to that of metal powder forming the internal electrode layer exceeds 1:5.

The internal electrode layer may be formed by adjusting a firing temperature of a conductive paste including metal powder and ceramic-based substance powder.

According to another aspect of the present invention, there is provided a ceramic electronic component including: a ceramic element; and an internal electrode layer formed within the ceramic element, wherein an area ratio of a non-electrode region to an electrode region of the internal electrode layer, in a cross section of the internal electrode layer is between 0.1% and 10%.

A thickness of the internal electrode layer may be 0.5 μm or less.

Connectivity of the internal electrode layer, as defined by a ratio of an actual length of the internal electrode layer to the total length of the internal electrode layer, may be 90% or more.

The non-electrode region may be trapped at a metal particle interface of the internal electrode layer.

The non-electrode region may include ceramic-based substance powder.

The internal electrode layer may be formed of a conductive paste including metal powder and ceramic-based substance powder whose grain size ratio to that of the metal powder exceeds 1:5.

The non-electrode region may be formed by adjusting a firing temperature of a conductive paste forming the internal electrode layer.

According to another aspect of the present invention, there is provided a method of manufacturing a ceramic electronic component, the method including:preparing ceramic green sheets; forming internal electrode patterns with a conductive paste including metal powder and ceramic-based substance powder whose grain size ratio to that of the metal powder exceeds 1:5; laminating ceramic green sheets having the internal electrode patterns formed thereon to form a ceramic laminate; and firing the ceramic laminate to form an internal electrode layer in which an area ratio of a non-electrode region to an electrode region is between 0.1% and 10%.

The firing of the ceramic laminate may be performed at a heating rate (i.e., a temperature increase rate) ranging from 30° C./60 s to 50° C./60 s.

Sintering of the metal powder included in the conductive paste may be restrained to 1000□.

Connectivity of the inner electrode layer may be 90% or more.

A thickness of the internal electrode layer may be 0.5 μm or less.

The non-electrode region may be trapped in the internal electrode layer during the firing of the ceramic laminate.

The non-electrode area may include a ceramic component.

The non-electrode region may include a binder or a solvent remaining therein after the firing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
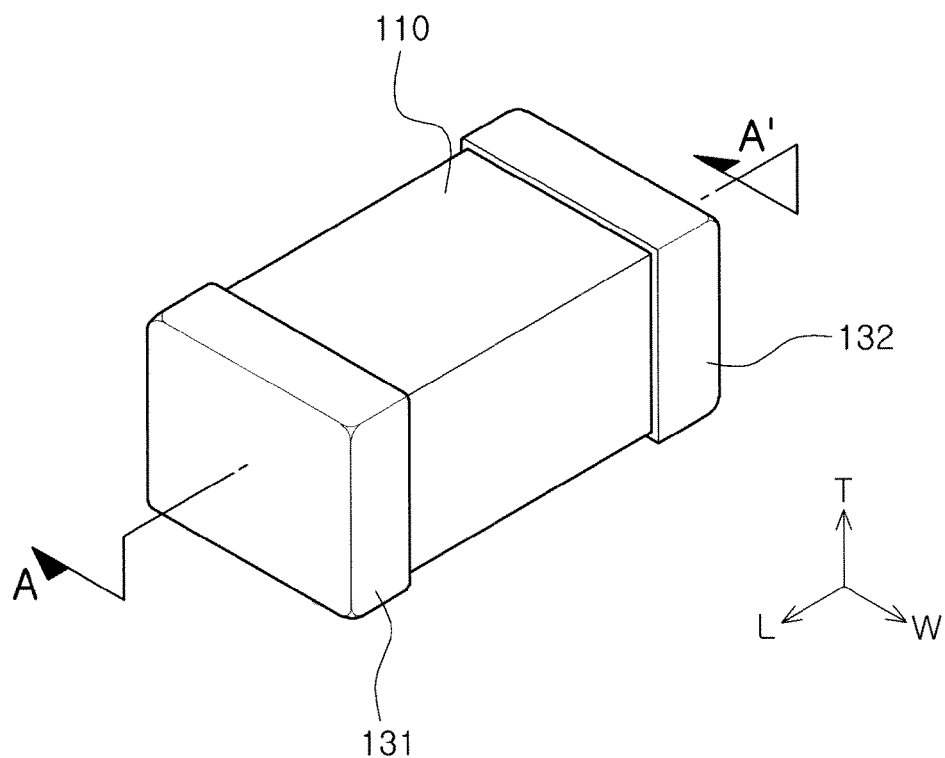
FIG. 1 is a schematic perspective view of a multilayer ceramic capacitor (MLCC) according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

An embodiment of the present invention relates to a ceramic electronic component, and electronic components using a ceramic material may include a capacitor, an inductor, a piezoelectric element, a varistor, a thermistor, and the like. Hereinafter, a multilayer ceramic capacitor (MLCC) will be described as an example of the ceramic electronic component.

Figure 2:
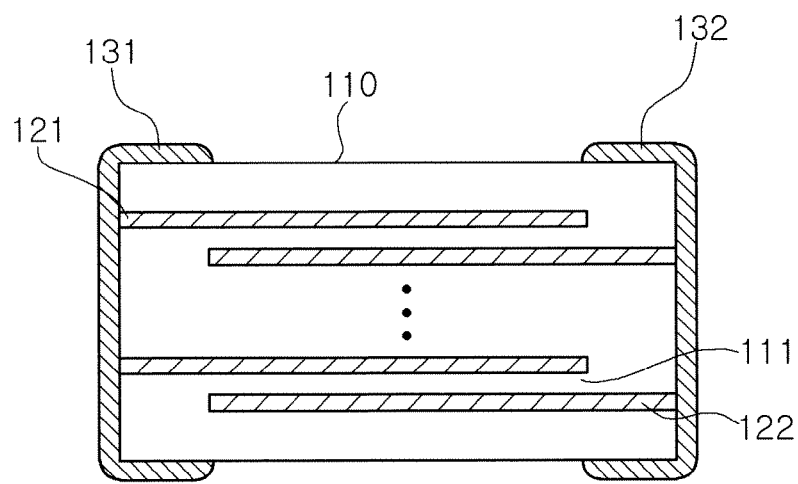
FIG. 2 is a schematic cross-sectional view of the MLCC taken along line A-A' in FIG. 1.

FIG. 1 is a schematic perspective view of a multilayer ceramic capacitor (MLCC) according to an embodiment of the present invention. FIG. 2 is a schematic cross-sectional view of the MLCC taken along line A-A' in FIG. 1.

With reference to FIGS. 1 and 2, the multilayer ceramic capacitor (MLCC) according to an embodiment of the present invention may include a ceramic element 110, internal electrode layers 121 and 122 formed within the ceramic element 110, and external electrodes 131 and 132 formed on external surfaces of the ceramic element 110.

In an embodiment of the present invention, a 'length direction' may be defined as an 'L' direction shown in FIG. 1. Likewise, a 'width direction' may be defined as a 'W' direction and a 'thickness direction' may be defined as a 'T' direction. Here, the 'thickness direction' may have the same conception as a direction of stacked dielectric layers, that is, a 'lamination direction.'

The ceramic element 110 may have a hexahedron shape according to an embodiment of the present invention, but the present invention is not limited thereto.

The ceramic element 110 may be formed by laminating a plurality of dielectric layers 111. The plurality of dielectric layers 111 constituting the ceramic element 110 may be sintered and integrated such that boundaries therebetween may not be readily apparent.

The dielectric layers 111 may be formed by sintering ceramic green sheets including ceramic powder.

The ceramic powder is not particularly limited so long as it is generally used in the art. The ceramic powder may include, for example, a $BaTiO_3$-based ceramic powder, but the present invention is not limited thereto. The $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, which is formed by partially employing Ca, Zr, or the like in $BaTiO_3$, but the present invention is not limited thereto.

The ceramic green sheets may include a transition metal, a rare earth element, magnesium (Mg), aluminum (Al), or the like, as well as the ceramic powder.

The thickness of each dielectric layer 111 may be appropriately altered according to a capacitance design of the multilayer ceramic capacitor. For example, the thickness of each dielectric layer 111 formed between two internal electrode layers after sintering may be 1.0 μm or less, but the present invention is not limited thereto.

The internal electrode layers 121 and 122 may be formed within the ceramic element 110. The internal electrode layers 121 and 122 may be formed and laminated on the ceramic green sheets. The internal electrode layers 121 and 122 may have each dielectric layer interposed therebetween within the ceramic element 110 through sintering.

The internal electrode layers 121 and 122 may be pairs of internal electrode layers having different polarities and may be disposed to be opposed to each other according to the lamination direction of the dielectric layers.

As shown in FIG. 2, respective ends of the first and second internal electrode layers 121 and 122 may be alternately exposed to one face of the ceramic element 110 in the length direction.

Although not shown, according to an embodiment of the present invention, the first and second internal electrode layers may have respective lead portions and may be exposed to the same face of the ceramic element through the lead portions. Alternatively, the first and second internal electrode layers may have respective lead portions and be exposed to one or more faces of the ceramic element through the lead portions.

The thickness of each of the internal electrode layers 121 and 122 may be appropriately determined according to the intended purpose thereof, or the like. For example, the thickness of each of the internal electrode layers 121 and 122 may be 0.5 μm or less. Alternatively, the thickness of each of the internal electrode layers 121 and 122 may be 0.1 μm to 0.5 μm.

Alternatively, the thickness of each of the internal electrode layers 121 and 122 may be 0.3 μm to 0.5 μm.

According to an embodiment of the present invention, 200 or more dielectric layers having the internal electrode layers formed therebetween may be laminated. The detailed description thereof will be described later.

According to an embodiment of the present invention, the external electrodes 131 and 132 may be formed on the external surfaces of the ceramic element 110. The external electrodes 131 and 132 may be electrically connected to the internal electrode layers 121 and 122. In detail, the external electrodes 131 and 132 may include a first external electrode 131 electrically connected to the first internal electrode layers 121 exposed to one face of the ceramic element 110, and a second external electrode 132 electrically connected to the second internal electrode layers 122 exposed to the other face of the ceramic element 110.

Also, although not shown, a plurality of external electrodes may be formed such that they are connected to the first and second internal electrode layers exposed to faces of the ceramic element.

The external electrodes 131 and 132 may be formed of a conductive paste including metal powder. As the metal powder included in the conductive paste, for example, nickel (Ni), copper (Cu), or an alloy thereof may be used, but the present invention is not particularly limited thereto. The thickness of the external electrodes 131 and 132 may be appropriately determined according to the intended purpose thereof, or the like. For example, the thickness of the external electrodes 131 and 132 may be 10 μm to 50 μm.

Figure 3:
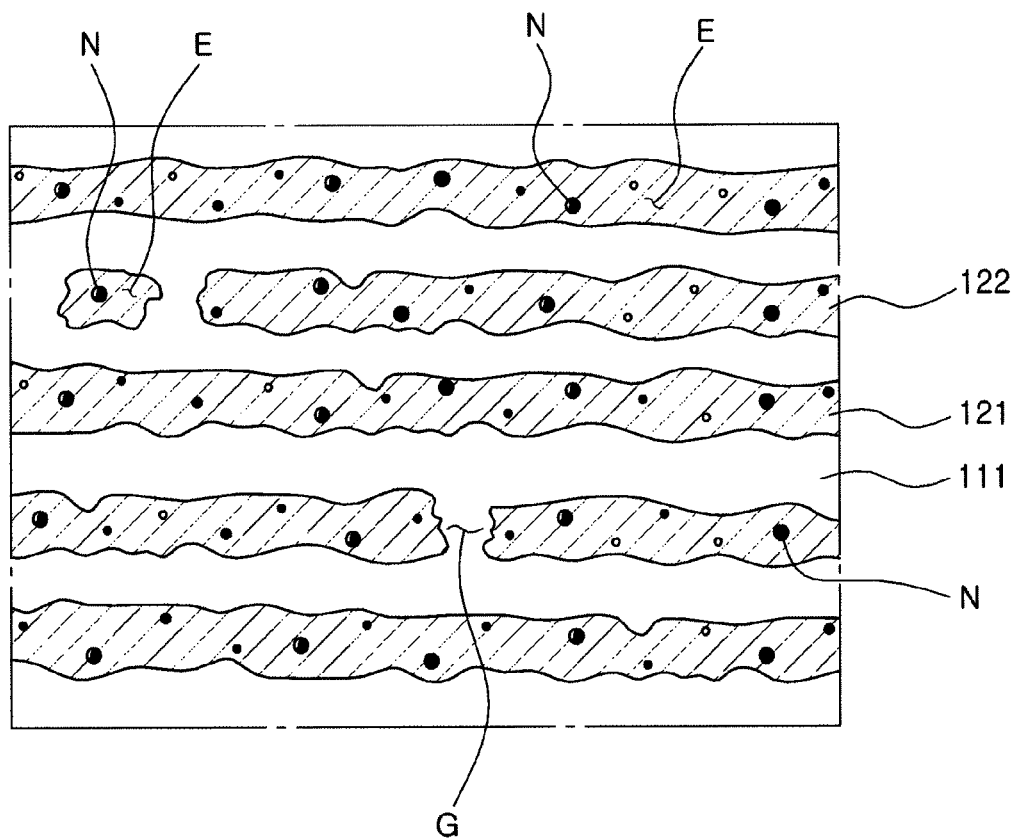
FIG. 3 is a schematic partially enlarged view showing a cross section of the MLCC according to an embodiment of the present invention.

FIG. 3 is a schematic partially enlarged view showing a cross section of the MLCC according to an embodiment of the present invention.

With reference to FIG. 3, each of the internal electrode layers 121 and 122 according to an embodiment of the present invention may include a non-electrode region N therein. According to an embodiment of the present invention, the portion of the internal electrode, excluding the non-electrode region N, may be understood as an electrode region E.

According to an embodiment of the present invention, the non-electrode region N may be formed during an internal electrode layer firing process. The non-electrode region N may be formed of a composition of the conductive paste forming the internal electrode layers. The non-electrode region N may include a ceramic component, but the present invention is not limited thereto. According to an embodiment of the present invention, the non-electrode region N may be formed of a component, among components included in the conductive paste, which is not a conductive metal. For example, the non-electrode region N may be made of ceramic powder. Also, a material forming the non-electrode region N may include, for example, a ceramic-based substance powder, a binder, a solvent, or the like. The binder and solvent may exist as a carbon-based component remaining in the non-electrode region through firing. Also, the non-electrode region N may be a pore.

According to an embodiment of the present invention, a material included in the composition of the conductive paste may be trapped at an interface, i.e., at a grain boundary of metal grains forming the internal electrode layers during firing. This can be clarified through the process of forming the internal electrode layers, to be described later.

According to an embodiment of the present invention, an area ratio of the non-electrode region N to the electrode region E of the internal electrode layer, in a cross section of the internal electrode layer may be between 0.1 and 10%.

As shown in FIG. 2, the multilayer ceramic capacitor may be cut in the length direction. In the cross section cut in the length direction, the area of the internal electrode layer, the area of the electrode region E, and the area of the non-electrode region N may be measured.

In an embodiment of the present invention, the area of the internal electrode layer, the area of the electrode region E, and the area of the non-electrode region N may be measured by scanning an image of a cross section of the multilayer ceramic capacitor through an optical microscope.

The process of measuring the area of the internal electrode layer, the area of the electrode region E, and the area of the non-electrode region N will be described with reference to FIGS. 3 and 4.

In an embodiment of the present invention, the area of the internal electrode layer refers to an area in which the internal electrode layer is continuous, except for a portion in which the internal electrode layer is disconnected. With reference to FIG. 3, the area of the internal electrode layer excludes the area of a gap G formed between the separated portions thereof. In an embodiment of the present invention, the gap G refers to a pore penetrating the internal electrode layer, and does not include a pore formed only at a portion of the surface of the internal electrode layer or formed in the internal electrode layer.

The internal electrode layer and the dielectric layer may be discriminated from the optical image, and the area of the internal electrode layer may be measured. The non-electrode region N and the electrode region E formed in the internal electrode layer may be shown as having different shades so as to be discriminated in the optical image. The area of the internal electrode layer, the area of the electrode region, and the area of the non-electrode region may be measured by using a computer program such as SigmaScan Pro, or the like, but the present invention is not limited to being measured thereby.

In an embodiment of the present invention, the area of the electrode region E may be understood as being obtained by subtracting the area of the non-electrode region N from the area of the internal electrode layer.

According to an embodiment of the present invention, the area ratio of the non-electrode region N to the electrode region E of the internal electrode layer, in the cross section of the internal electrode layer cut in the length direction of the multilayer ceramic capacitor may be between 0.1% and 10%.

According to an embodiment of the present invention, connectivity of the internal electrode layer may be 90% or greater by adjusting the area ratio of the non-electrode region N.

According to an embodiment of the present invention, connectivity of the internal electrode layer may be defined as a ratio of the length of portions actually forming the internal electrode layer with respect to the total length of the internal electrode layer (i.e., actual length of the internal electrode layer:the total length of the internal electrode layer).

The total length of the internal electrode layer and the length of portions actually forming the internal electrode layer may be measured through the use of an optical image obtained by scanning the cut cross section of the multilayer ceramic capacitor.

In detail, the ratio of the length of portions actually forming the internal electrode layer with respect to the total length of the internal electrode layer may be measured from the image obtained by scanning the cross section of the ceramic element in the length direction, which is obtained by cutting the central portion of the ceramic element in the width direction.

In an embodiment of the present invention, the total length of the internal electrode layer may refer to the length including the gap G formed between the separated portions thereof, in each internal electrode. The length of portions actually forming the internal electrode may refer to the length excluding the gap G formed between the separated portions thereof, in each internal electrode. As described above, the gap G refers to a pore penetrating the internal electrode layer and does not include a pore formed only at a portion of the surface of the internal electrode layer or formed in the internal electrode layer.

Figure 4:
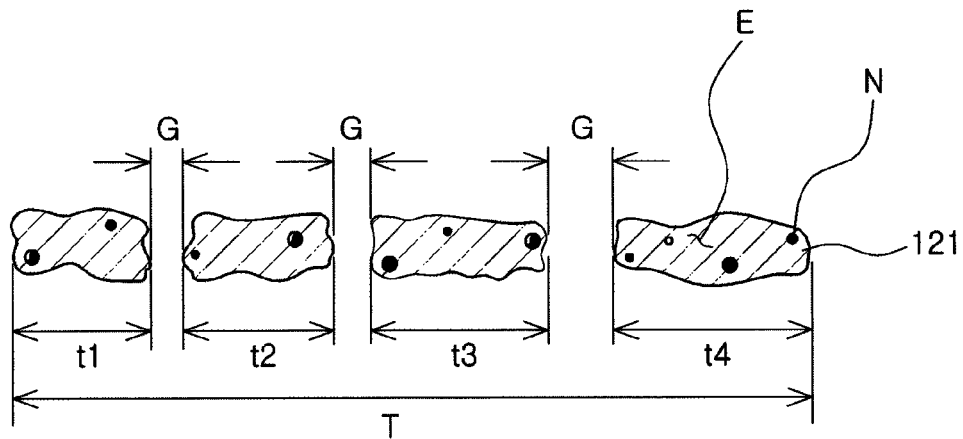
FIG. 4 is a schematic partially enlarged view showing an internal electrode layer according to an embodiment of the present invention.

According to an embodiment of the present invention, as shown in FIG. 4, the total length of the internal electrode layer and the length of portions actually forming the internal electrode layer may be measured by taking a portion of the optical image. In detail, when it is assumed that the total length of the internal electrode layer, as the total length of the internal electrode layer 121 including pores in some points thereof, is T, and the length of portions actually forming the internal electrode layer are t1, t2, t3, connectivity of the internal electrode layer may be expressed as (t1+t2+t3+·+tn)/T. In FIG. 4, the portions actually forming the internal electrode layer are expressed as t1, t2, t3 and t4, but the number of portions actually forming the internal electrode layer is not particularly limited.

According to an embodiment of the present invention, the actual length of the internal electrode layer may be measured by subtracting the length of the gaps G from the total length T of the internal electrode layer.

According to an embodiment of the present invention, the thickness of each of the internal electrode layers 121 and 122 may be 0.5 μm or less. Alternatively, the thickness of each of the internal electrode layers 121 and 122 may be 0.1 μm to 0.5 μm. Alternatively, the thickness of each of the internal electrode layers 121 and 122 may be 0.3 μm to 0.5 μm.

In an embodiment of the present invention, as mentioned above, the thickness of the internal electrode layer may be measured by scanning an image of a cross section of the multilayer ceramic capacitor through the optical microscope. The thickness of the internal electrode layer may be obtained by taking a portion of the scanned image.

In an embodiment of the present invention, the thickness of the internal electrode layer may be calculated as a ratio of the area of the internal electrode layer with respect to the actual length of the internal electrode layer (internal electrode layer area: actual length of the internal electrode layer).

The area of the internal electrode layer may refer to the area including the electrode region E and the non-electrode region N, and the actual length of the internal electrode layer may be the length excluding the gap G formed between the separated portions thereof.

According to an embodiment of the present invention, the area of the internal electrode layer, the area of the electrode region E, the area of the non-electrode region N, and the actual length of the internal electrode layer may be measured in each internal electrode layer, and may be multiplied by the number of laminations thereof so as to be generalized in terms of the entire multilayer ceramic capacitor.

In the multilayer ceramic capacitor, capacitance may be formed by an overlapped area of the first and second internal electrodes.

In general, internal electrode layers may be conglomerated to be broken during sintering. Then, capacitance formed due to the internal electrode layers may be reduced and irregularly formed, degrading the reliability thereof. Thus, in order to implement high capacitance, securing connectivity of the internal electrode layer may be required.

However, as the multilayer ceramic capacitor is reduced in size and highly multilayered, the internal electrode layers become thinner. As the internal electrode layers become thinner, the internal electrode layers may be easily broken during sintering, such that securing connectivity of the internal electrode layer may be difficult.

However, according to an embodiment of the present invention, connectivity of the internal electrode layer may be secured through the inclusion of the non-electrode region in the internal electrode layer. According to an embodiment of the present invention, thinness of the internal electrode layer may be compensated for by including the non-electrode region therein. Also, a disconnection of the internal electrode layer may be prevented by restraining a firing shrinkage of the metal powder during the firing of the internal electrode layer. When the area ratio of the non-electrode region to the electrode region of the internal electrode layer is small, it is difficult to secure connectivity of the internal electrode layer. On the other hand, when the area ratio of the non-electrode region to the electrode region of the internal electrode layer is extremely large, connectivity of the internal electrode layer may deteriorate.

Figure 5A:
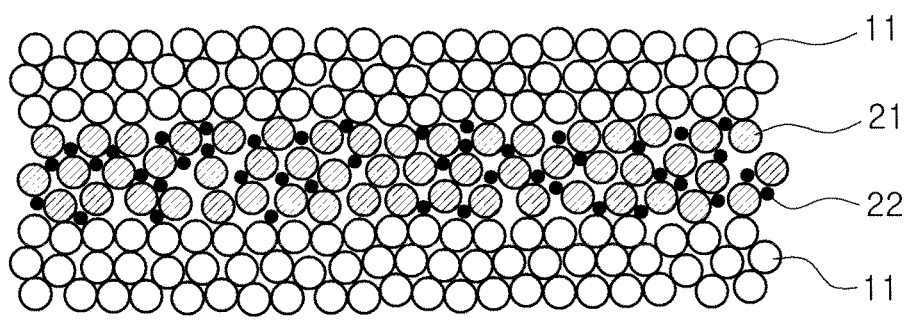
FIGS. 5A and 5B are schematic views showing a sintering shrinkage behavior of the internal electrode layer according to an embodiment of the present invention.
Figure 5B:
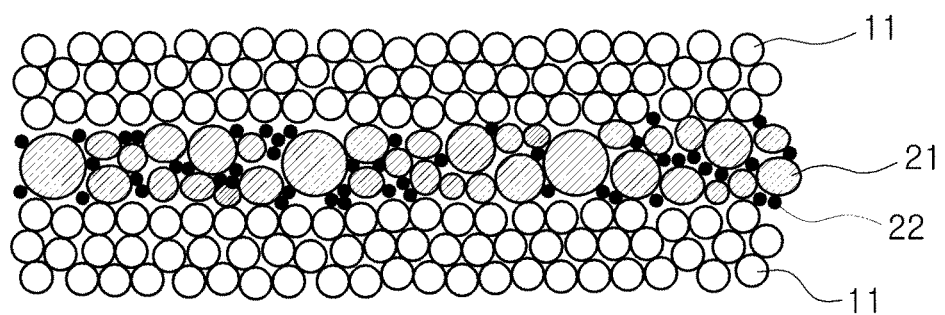

FIGS. 5A and 5B are schematic views showing a sintering shrinkage behavior of the internal electrode layer according to an embodiment of the present invention. The present invention will be described with reference to FIGS. 5A and 5B.

According to an embodiment of the present invention, the internal electrode layer may be made of a conductive paste including metal powder 21 and ceramic-based substance powder 22.

According to an embodiment of the present invention, the type of the metal powder 21 forming the internal electrode layer is not particularly limited. For example, a base metal may be used. Nickel (Ni), manganese (Mn), chromium (Cr), cobalt (Co), aluminum (Al), or an alloy thereof may be provided, and the metal powder 21 may include at least one among them, but the present invention is not limited thereto.

An average grain size of the metal powder 21 is not particularly limited. For example, the average grain size may be 400 nm or less. In detail, the average grain size may be 50 nm to 400 nm.

According to an embodiment of the present invention, the ceramic-based substance powder 22 may be the same type as that of as the ceramic powder 11 forming the dielectric layers. The ceramic-based substance powder 22 may move from the internal electrode layer to the dielectric layer during firing, and may be the same type as that of the ceramic powder forming the dielectric layers in order to prevent degradation in characteristics of the dielectric layers. The ceramic-based substance powder 22 may be, for example, a $BaTiO_3$-based ceramic powder, but the present invention is not limited thereto. The BaTiO3-based ceramic powder may include $(Ba_{1-x}Ca_x)\,TiO_3$, $Ba(Ti_{1-y}Ca_y)O_3$, $(Ba_{1-x}Ca_x)\,(Ti_{1-y}Zr_y)O_3$, $Ba(Ti_{1-y}Zr_y)O_3$, or the like, which is formed by partially employing Ca, Zr, or the like in $BaTiO_3$, but the present invention is not limited thereto.

The grain size of the ceramic-based substance powder 22 may be smaller than that of the metal powder 21. For example, a ratio of the grain size of the ceramic-based substance powder 22 to that of the metal powder 21 (i.e., ceramic-based substance powder:metal powder) may not exceed 1:5, but the present invention is not limited thereto. Also, according to an embodiment of the present invention, the ratio of the grain size of the ceramic-based substance powder 22 to that of the metal powder 21 (i.e., ceramic-based substance powder: metal powder) may be 1:3 to 1:4.

According to an embodiment of the present invention, each of the grain size of the metal powder 21 and that of the ceramic-based substance powder 22 may be an average grain size thereof. According to an embodiment of the present invention, the average grain size of the ceramic-based substance powder and the average grain size of the metal powder may be measured according to an average grain size measurement method defined by the ASTM (American Society for Testing and Materials).

According to an embodiment of the present invention, the grain size of the ceramic-based substance powder 22 is smaller than that of the metal powder 21, so that the ceramic-based substance powder 22 may be distributed between the metal grains of the metal powder 21.

According to an embodiment of the present invention, when the ratio of the grain size of the ceramic-based substance powder to that of the metal powder (i.e., ceramic-based substance powder:metal powder) is less than 1:5, the ceramic-based substance powder may not be able to effectively restrain the shrinkage of the metal grains. The ceramic-based substance powder may be disposed between the metal grains to restrain a grain growth of the metal grains when the metal grains are sintered.

Here, the ceramic-based substance powder, grains of which have a size smaller than that of a pore formed during the sintering of the metal grains, may not limit contact of the metal grains, and may have difficulty in obstructing the grain growth of the metal grains. The detailed description thereof will be described later.

According to an embodiment of the present invention, the composition of the conductive paste forming the internal electrode layers may further include a binder, a solvent, other additive, or the like.

As the binder, polyvinylbutyral, a cellulose-based resin, or the like, may be used, but the present invention is not limited thereto. Polyvinylbutyral having strong adhesion characteristics may enhance bonding strength between the conductive paste and the ceramic green sheet.

The cellulose-based resin, having a chair-type structure, has characteristics quickly restored due elasticity when it is deformed. Through the inclusion of the cellulose-based resin, a flat print face may be secured.

The solvent is not particularly limited. For example, butylcarbitol, kerosene, or a terpineol-based solvent may be used therefor. Specific types of the terpineol-based solvent may include dehydro terpineol, dehydro terpineol acetate, or the like, but the present invention is not limited thereto.

According to an embodiment of the present invention, the composition of the conductive paste may be trapped to form the non-electrode region N in the internal electrode layer, during the firing of the internal electrode layer.

According to an embodiment of the present invention, a material included in the composition of the conductive paste may be trapped at the interface, i.e., the grain boundary, of the metal grains forming the internal electrode layer during the firing. Also, a pore may be formed at the interface of the metal grains during the firing performed on the internal electrode layer, and the pore may be formed in the internal electrode layer while being trapped, unlike the gap G illustrated in FIGS. 3 and 4.

In general, the conductive paste is printed on the ceramic green sheets, the ceramic green sheets having the conductive paste printed thereon may be laminated, and then the conductive paste may be simultaneously fired together with the ceramic green sheets.

Also, in a case in which the internal electrode layer is made of a base metal, when firing is performed on the internal electrode layer in the atmosphere, the internal electrode layer may be oxidized. Thus, the ceramic green sheet and the internal electrode layer may be simultaneously fired under a reduction atmosphere.

The dielectric layers of the multilayer ceramic capacitor may be formed by firing the ceramic green sheets at a high temperature of about 1100□ or higher. When the internal electrode layer is made of a base metal such as nickel (Ni), or the like, the oxidization of the internal electrode layer may start from a temperature of 400□, a relatively low temperature, and then the internal electrode layer may be sintered and shrunken and may be rapidly shrunken at 1000□ or higher. When the internal electrode layer is rapidly fired, the electrode may be conglomerated or broken due to the excessive firing of the internal electrode layer, and connectivity of internal electrode layer may deteriorate to degrade the capacitance of the multilayer ceramic capacitor. Also, after the firing, the multilayer ceramic capacitor may have a defective internal structure such as a crack, or the like.

Thus, improvements in connectivity of the internal electrode layer through minimizing a shrinkage rate difference between the internal electrode layer and the dielectric layer by possibly delaying a sintering initiation temperature of the metal powder, starting from a relatively low temperature of 400□ to 500□, may be required.

FIG. 5A shows an initial stage of firing before the sintering shrinkage of the metal powder 21 starts, and FIG. 5B schematically shows a state in which the metal powder 21 is sintered and shrunken as temperature rises.

In FIGS. 5A and 5B, the ceramic powder 11 may form the dielectric layers 11 illustrated in FIG. 2 through sintering.

With reference to FIGS. 5A and 5B, the metal powder is shrunken in the initial stage of firing, and the ceramic-based substance powder 22 may be disposed between the metal grains of the metal powder to limit the contact between the metal grains.

In general, before the ceramic powder 11 forming the dielectric layers is shrunken, the metal powder is sintered to form the internal electrode layer. Thus, the internal electrode layer may be conglomerated when the ceramic powder is shrunken, degrading the connectivity of the inner electrode.

However, according to an embodiment of the present invention, the connectivity of the inner electrode may be secured by controlling the area ratio of the non-electrode region within the internal electrode layer.

According to an embodiment of the present invention, the grain size ratio of the ceramic-based substance powder 22 may be controlled and the grains thereof may be distributed between the grains of the metal powder 21. Then, sintering of the metal powder 21 may be restrained to about 1000□ or higher. The sintering of the metal powder 21 may be restrained to a certain temperature as much as possible, and the sintering of the ceramic powder 11 forming the dielectric layers may be initiated. As the densification of the ceramic powder 11 forming the dielectric layers is undertaken, the internal electrode layer starts to be densified, rapidly accelerating sintering.

According to an embodiment of the present invention, the ceramic-based substance powder 22 may lower the sintering shrinkage initiation temperature of the metal powder 21 and restrain the sintering shrinkage of the metal powder 22. Since the grain size ratio of the ceramic-based substance powder 22 is controlled, the ceramic-based substance powder 22 may prevent the grains of metal powder from coming into contact with each other when the metal powder is sintered to be shrunken, restraining a grain growth of the metal powder and restraining the internal electrode from being conglomerated.

According to an embodiment of the present invention, a portion of the ceramic-based substance powder 22 may be transferred to the surface of the internal electrode layer so as to be sintered together with the ceramic powder 11 forming the dielectric layers. However, another portion of the ceramic-based substance powder 22 may fail to escape from the metal powder 21 until sintering is completed, and thus may be trapped at the grain boundary of the metal grains as shown in FIG. 3. Accordingly, the ceramic-based substance powder may form the non-electrode region N in the internal electrode layer.

According to an embodiment of the present invention, a portion of the ceramic-based substance powder 22 is transferred to the surface of the internal electrode layer so as to be sintered together with the ceramic powder 11 forming the dielectric layers. However, when the heating rate of firing is adjusted, another portion of the ceramic-based substance powder 22 may not escape from the metal powder 21 to be trapped at the grain boundary of the metal grains as shown in FIG. 3.

According to an embodiment of the present invention, the binder, the solvent, or other additives included in the composition of the conductive paste forming the internal electrode layers are removed during the firing. However, when the heating rate of the firing process is adjusted, a part of the binder, the solvent, and other additives may not be completely removed but may be trapped at the grain boundary of the metal grains as shown in FIG. 3. Accordingly, the binder, the solvent, and other additives may form the non-electrode region N in the internal electrode layer.

As described above, according to an embodiment of the present invention, the area ratio of the non-electrode region N to the electrode region E of the internal electrode layer, in a cross section of the internal electrode layer may be between 0.1% and 10%.

Recently, as multilayer ceramic capacitors have advanced toward having a small size and light weight, the internal electrode layers thereof are becoming thinner. In order to thin internal electrode layers, metal power having small grains may be used, but in this case, it is difficult to control the sintering shrinkage of the metal powder and secure connectivity of the inner electrode layer.

However, according to an embodiment of the present invention, the sintering shrinkage of metal powder may be restrained by forming the non-electrode region in the internal electrode layer and adjusting the ratio of the non-electrode region. Also, the connectivity of the inner electrode layer may be improved by adjusting the ratio of the non-electrode region formed in the internal electrode layer.

Hereinafter, a method of manufacturing the multilayer ceramic capacitor according to an Example of the present invention will be described.

According to an Example of the present invention, a plurality of ceramic green sheets may be prepared. In order to manufacture the ceramic green sheets, slurry is fabricated by mixing ceramic powder, a binder, a solvent, and the like, and the slurry may be formed to have a sheet type having a thickness of several micrometers (μm) through a doctor blade method. Each of the ceramic green sheets is then sintered to form each dielectric layer 111 as shown in FIG. 2.

Next, conductive paste for an internal electrode is applied to the ceramic green sheets to form internal electrode patterns. The internal electrode patterns may be formed through screen printing or Gravure printing.

Then, the ceramic green sheets having the internal electrode patterns formed thereon are laminated and pressurized in the lamination direction so as to be compressed. Accordingly, a ceramic laminate including the internal electrode patterns formed thereon can be manufactured.

Thereafter, the ceramic laminate is cut into areas, each corresponding to one capacitor to form a chip. Here, the ceramic laminate may be cut such that the respective one ends of the internal electrode patterns are alternately exposed to sides thereof. Thereafter, the ceramic laminate as a chip may be fired to manufacture a ceramic element. As described above, firing may be performed under a reducing atmosphere. Also, the firing may be performed by adjusting the heating rate. The heating rate may range from 30□/60 s to 50□/60 s, but the present invention is not limited thereto.

Then, external electrodes may be formed to cover the side faces of the ceramic element and be electrically connected to the internal electrode layers exposed to the side faces of the ceramic element. Thereafter, the surface of the external electrodes may be plated with nickel, tin, or the like.

According to an Example of the present invention, as described above, the ratio of the non-electrode region formed in the internal electrode layer with respect to the electrode region may be between 0.1% and 10%. Accordingly, the connectivity of the inner electrode layer may be improved and high capacitance may be implemented.

The multilayer ceramic capacitor according to an Example of the present invention was manufactured by adjusting the grain sizes of the ceramic-based substance powder (BT, $BaTiO_3$ powder) and the metal powder (Ni) as shown in Table 1 below.

TABLE 1

|   | BT grain size:Ni grain size | AN:AE (%) | Thickness of internal electrode layer (μm) | Electrode connectivity |
|---|---|---|---|---|
| 1* | 1:5 | 0.08% | 0.41 | 86.3% |
| 2 | 1:4.5 | 0.1% | 0.44 | 90.2% |
| 3 | 1:4 | 0.11% | 0.42 | 92.1% |
| 4* | 1:6 | 0.57% | 0.55 | 90.2% |
| 5 | 1:4 | 1.2% | 0.39 | 90.8% |
| 6 | 1:4 | 2.5% | 0.47 | 92.9% |
| 7 | 1:4 | 3.1% | 0.47 | 93.2% |
| 8* | 1:4 | 4.4% | 0.53 | 92.7% |
| 9 | 1:4 | 5.7% | 0.50 | 94.3% |
| 10 | 1:4 | 6.5% | 0.43 | 92.7% |
| 11 | 1:4 | 7.6% | 0.41 | 91.9% |
| 12* | 1:4 | 8.3% | 0.52 | 90.3% |
| 13 | 1:4 | 9.6% | 0.37 | 90.4% |
| 14 | 1:4 | 9.9% | 0.44 | 90.2% |
| 15* | 1:4 | 10.1% | 0.45 | 89.3% |
| 16* | 1:4 | 11.3% | 0.43 | 87.5% |
| 17 | 1:3 | 5.3% | 0.41 | 90.1% |
| 18 | 1:3.5 | 6.2% | 0.46 | 90.5% |
| 19 | 1:3.5 | 4.3% | 0.44 | 90.2% |
| 20 | 1:4 | 6.5% | 0.43 | 92.7% |
| 21 | 1:4 | 2.5% | 0.47 | 92.9% |
| 22* | 1:5 | 0.5% | 0.45 | 82.2% |
| 23* | 1:5 | 5.2% | 0.56 | 83.5% |
| 24* | 1:6 | 6.3% | 0.61 | 81.2% |

[Evaluation]

1. Area Ratio of Non-Electrode Region to Electrode Region of Internal Electrode (AN:AE(%))

The multilayer ceramic capacitor was cut in the length direction and an image of the cut cross section thereof was scanned by using an optical microscope. An area of 10 μm×5 μm (width×length) was taken from the optical image, and the area of the internal electrode layer, the area (AE) of the electrode region, and the area (AN) of the non-electrode region were measured. The area of the internal electrode layer was measured by excluding the gap G penetrating the internal electrode layer. The area (AN) of the non-electrode region formed in the internal electrode layer, through the optical image was measured, and the area (AE) of the electrode region was obtained and set by subtracting the area (AN) of the non-electrode region from the area of the internal electrode layer.

2. Thickness of Internal Electrode Layer

An actual length of the internal electrode layer was measured from the optical image taken so as to have the size of 10 μm×5 μm (width×length), and a thickness of the internal electrode layer may be calculated as a ratio of the area of the internal electrode layer with respect to the actual length of the internal electrode layer (internal electrode layer area:actual length of the internal electrode layer). The actual length of the internal electrode layer was measured at a central portion of the internal electrode layer, and in this case, the gap G formed between separated portions of the internal electrode layer was excluded in the measurement.

3. Connectivity of Internal Electrode Layer

The total length of the internal electrode layer was measured from the optical image taken so as to have the size of 10 μm×5 μm (width×length). The total length of the internal electrode layer was measured as a length including the gap G formed between the separated portions of the internal electrode layer. The connectivity of the internal electrode layer was calculated as the ratio of the actual length of the internal electrode layer to the total length of the internal electrode layer (actual length of the internal electrode layer:total length of the internal electrode layer).

With reference to Table 1, test samples 22, 23, and 24 have a BT:Ni grain size ratio of 1:5 or less. In this case, it was determined that the grain size of the ceramic-based substance powder was extremely small, such that the shrinkage of the nickel powder was not restrained and accordingly, the connectivity of the internal electrode layer was less than 90%.

Referring to test sample 1, it showed that the BT:Ni grain size ratio was 1:5, the ratio of AN:AE(%) was less than 0.1%, and thus the connectivity of the internal electrode layer was less than 90%.

Referring to test samples 15 and 16, the BT:Ni grain size ratio was 1:4, but the ratio of AN:AE (%) exceeded 10%, such that the connectivity of the internal electrode layer was less than 90%.

Referring to test samples 4, 8, 23, and 24, when the thickness of the internal electrode layer was 0.5 μm or greater, the connectivity of the internal electrode layer was 90% or more, or 90% or less, regardless of the BT:Ni grain size ratio. Also, when the thickness of the internal electrode layer is 0.5 μm or greater, it would be difficult to secure the number of laminations thereof, which leads to difficulty in implementing high capacitance under the same conditions.

As set forth above, according to embodiments of the invention, connectivity of internal electrodes can be secured by controlling an area ratio of a non-electrode region to an electrode region within the internal electrode layers.

As the multilayer ceramic capacitor is reduced in size and highly multilayered, the internal electrode layers become thinner. As the internal electrode layers become thinner, the internal electrode layers can be easily broken during sintering, such that securing connectivity of the internal electrode layer may be difficult. However, in an embodiment of the present invention, a non-electrode region can be formed within the internal electrode, and the area ratio of the non-electrode region can be adjusted to secure the connectivity of the internal electrode layer.

According to an embodiment of the present invention, a ceramic-based substance powder could be disposed between metal grains during the sintering of the metal grains to thereby restrain a grain growth of the metal grains, and be trapped in the internal electrode layer to secure the connectivity of the internal electrode layer.

According to an embodiment of the present invention, a defect such as a crack, or the like, caused in the internal structure of the ceramic electronic component may be prevented after firing.

According to an embodiment of the present invention, the capacitance of the multilayered ceramic capacitor can be secured.

While the present invention has been shown and described in connection with the embodiments, it will be apparent to those skilled in the art that modifications and variations can be made without departing from the spirit and scope of the invention as defined by the appended claims.

What is claimed is:

1. A ceramic electronic component comprising:
a ceramic element; and
an internal electrode layer formed within the ceramic element, having a thickness of 0.5 μm or less, and including a non-electrode region formed therein,
wherein an area ratio of the non-electrode region to an electrode region of the internal electrode layer, in a cross section of the internal electrode layer is between 0.1% and 10%, and the non-electrode region includes a ceramic component.

2. The ceramic electronic component of claim 1, wherein a thickness of the internal electrode layer is 0.5 μm or less.

3. The ceramic electronic component of claim 1, wherein connectivity of the internal electrode layer, as defined by a ratio of an actual length of the internal electrode layer to the total length of the internal electrode layer (actual length of the internal electrode layer:total length of the internal electrode layer), is 90% or more.

4. The ceramic electronic component of claim 1, wherein the internal electrode layer is formed of a conductive paste including metal powder and ceramic-based substance powder whose grain size ratio to that of the metal powder exceeds 1:5.

5. The ceramic electronic component of claim 1, wherein the non-electrode region is formed by firing a conductive paste forming the internal electrode layer at a heating rate ranging from 30° C./60 s to 50° C./60 s.

6. A ceramic electronic component comprising:
a ceramic element; and
an internal electrode layer formed within the ceramic element,
wherein an area ratio of a non-electrode region to an electrode region of the internal electrode layer, in a cross section of the internal electrode layer is between 0.1% and 10%.

7. The ceramic electronic component of claim 6, wherein a thickness of the internal electrode layer is 0.5 μm or less.

8. The ceramic electronic component of claim 6, wherein connectivity of the internal electrode layer, as defined by a ratio of an actual length of the internal electrode layer to the total length of the internal electrode layer, is 90% or more.

9. The ceramic electronic component of claim 6, wherein the non-electrode region is trapped at a metal particle interface of the internal electrode layer.

10. The ceramic electronic component of claim 6, wherein the non-electrode region includes ceramic-based substance powder.

11. The ceramic electronic component of claim 6, wherein the internal electrode layer is formed of a conductive paste including metal powder and ceramic-based substance powder whose grain size ratio to that of the metal powder exceeds 1:5.

12. The ceramic electronic component of claim 6, wherein the non-electrode region is formed by adjusting a firing temperature of a conductive paste forming the internal electrode layer.

* * * * *